United States Patent Office 3,154,505
Patented Oct. 27, 1964

3,154,505
METHOD OF SUBDIVIDING HIGHER ALCOHOLS
Henry T. Watanabe, Ponca City, Okla., assignor to Continental Oil Company, Ponca City, Okla., a corporation of Delaware
No Drawing. Filed July 5, 1960, Ser. No. 40,574
7 Claims. (Cl. 260—615)

This invention relates to a method of subdividing higher alcohols and more particularly it relates to a method whereby an alcohol which is a solid at room temperature may be reduced to finely divided particles.

Water losses due to evaporation in certain parts of the world as, for example, in the semi-arid southwestern section of the United States are enormous. This, of course, is highly objectionable. The latter is true because many communities in that part of the United States are dependent to a large extent, if not entirely so, upon reservoirs as their sole source of water supply. In an attempt to reduce water losses from such reservoirs by evaporation, it has been proposed that certain organic compounds having a density of less than one be added to the water supply. The theory is that this material will form a film on the water surface and thus reduce the water evaporation rate. While the use of such a material as heretofore practiced has proven to be beneficial, the results, however, have not been entirely satisfactory.

A reason for the deficiencies of these materials as heretofore used will be apparent from the following discussion. The greatest effectiveness of the material is attained only when the material forms a continuous film (which is also monomolecular) on the surface of the water. It has been reported that the rate of release of the molecules which form the monomolecular film is a function largely of the wetted perimeter of the alcohol particle which in turn is the air-water-solid-interface. It, therefore, follows that the finer the particles introduced on the water surface, the greater the wetted perimeter will be. However, it is reported by one authority that small particles of alcohol are pulled almost completely under the water by the surface tension unless the particles are extremely fine. It is apparent, therefore, that an optimum size exists for the alcohol particles. At the present time it is believed that the optimum range for alcohol particles is from 0.02 to 0.25 millimeter diameter.

It is, therefore, a principal object of the present invention to provide a process for preparing higher alcohols in finely divided form. It is another object of the invention to provide a process for preparing higher alcohols in finely divided form, whereby said process produces particles of predetermined and controlled diameters. It is still another object of the invention to provide solid alcohols in finely divided form. It is yet another object of the present invention to provide a process for retarding the evaporation of water from a reservoir, said process comprising the addition to the water in said reservoir of the finely divided solid alcohols prepared by the process of this invention. These and other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

This invention, briefly stated, is a method of subdividing a higher alcohol into finely divided particles which comprises introducing the alcohol into a solvent which can be either a water-soluble oxygenated organic compound or a mixture of water-soluble oxygenated organic compound and water. The mixture is then heated with agitation until the alcohol has melted. After all of the alcohol has melted, the mixture is allowed to cool with agitation to a temperature below the melting point of the alcohol. This causes the formation of finely divided particles of the alcohol which can then be recovered.

Before proceeding with specific examples illustrating my invention, it may be well to indicate in general the nature of the materials and conditions required in the process.

Suitable alcohols for use in my invention are those which are normally a solid at room temperature. Among the alcohols meeting this requirement are the saturated aliphatic alcohols, unsaturated aliphatic alcohols, ether alcohols, and alkyl substituted cycloparaffinic alcohols, containing from about 14 to about 30 carbon atoms in the molecule. Specific examples of alcohols include the following: hexadecanol, octadecanol, nonadecanol, eicosanol, docosanol, pentacosanol, pentadecenol, trans-octadecenol, 2 - hexadecyloxyethanol, hexadecyloxylethoxyethanol, and branched C–12 alkylcyclohexanol. Preferred alcohols are those containing from about 16 to about 20 carbon atoms, with the saturated aliphatic alcohols conforming to this limitation being the more desirable.

As stated previously, the solvent can be either a water-soluble oxygenated organic compound or a mixture of water-soluble oxygenated organic compound and water. Suitable water-soluble oxygenated organic compounds include aliphatic alcohols containing from one to four carbon atoms, glycols, monoethers of ethylene glycol, glycerine and ketones. Examples of suitable oxygenated organic compounds include the following: methanol, ethanol, n-propanol, isopropanol, isobutanol, ethylene glycol, propylene glycol, hexylene glycol, glycerine, acetone, methylethyl ketone, monomethyl ether of ethylene glycol, monoethyl ether of ethylene glycol, and monobutyl ether of ethylene glycol. Preferred water-soluble oxygenated organic compounds are ethanol, hexylene glycol, and the monomethyl ether of ethylene glycol.

I have found that the size of the individual particles of the alcohol can be controlled within limits by varying the particular solvent used, by the composition of the solvent used, by the solid alcohol to solvent ratio, or by any combination thereof. Accordingly, I can prepare alcohol particles having diameters in the range of 0.02 to 0.25 millimeter, which has been stated, previously, to be the optimum size desired presently. In addition, I can readily prepare alcohol particles having diameters in the range of 0.01 to 1 millimeter. It is within the scope of my invention to prepare alcohol particles having diameters in the range of 0.005 to 2 millimeters. To minimize solvent loss, the solvent can be added to the mixture after the alcohol has been melted. If desired, the process may be carried out at super atmospheric pressures to minimize solvent losses. The finely divided particles for the alcohol can be recovered from the solvent by any known and convenient means. Examples of suitable means for recovery include filtration, decantation, or decantation followed by filtration.

As to the amounts of the various components used, I have found that a suitable range is from about 2 to about 25 parts of alcohol to 100 parts of solvent, with a more suitable range being from about 5 to about 18 parts of alcohol to 100 parts of solvent. A preferred range is about 9 to about 13 parts of alcohol per 100 parts of solvent.

The solvent is either an oxygenated organic compound alone or a mixture of water and oxygenated organic compound. Depending upon the particular oxygenated organic compound used, the water-oxygenated organic compound ratio can be varied as follows: 33 to 78 parts of water to 18 to 84 parts of the oxygenated organic compound with preferred quantities being 60 to 70 parts of water to 12 to 38 parts of the oxygenated organic compound. As used herein, and in the appended claims, parts are parts by weight.

In order to disclose the nature of the present invention still more clearly, the following illustrative examples will be given. It is to be understood that the invention is not to be limited to the specific conditions or details set forth in these examples except insofar as such limitations are specified in the appended claims.

EXAMPLES

Procedure

A suitable amount of solid alcohol was added to a suitable volume of solvent. The mixture was heated with agitation until the alcohol melted. After all of the alcohol had melted, the mixture was allowed to cool with agitation to a temperature below the melting point of the alcohol. The alcohol beads thus formed were then separated from the solvent by filtering. In instances where desired, the beads were dried.

Results

Using 10 grams of eicosanol, a mixture of 20 milliliters of ethanol, and 70 milliliters of water produced beads ranging from .02 to .25 millimeter, while a mixture of 60 milliliters of ethanol and 30 milliliters of water yielded beads ranging from .02 to .05 millimeter, with most of the particles near .02 millimeter. When ethanol was used alone, particles less than .02 millimeter were produced; however, gelling occurred if water was added. With 20 milliliters of isopropanol and 70 milliliters of water, 10 grams of the eicosanol produced beads of about .5 millimeter. With glycerine, a 30 glycerine/60 water ratio yielded beads about 1 millimeter, while hexylene glycol in the same ratio yielded beads from .01 to .05 millimeter with most particles less than .025 millimeter. Ethylene glycol produced beads ranging from .05 to .5 millimeter, depending on the glycol-water ratio.

Use of a nonvolatile solvent (e.g., glycerine) necessitated the washing of the beads free of solvent in order to attain complete drying. On the other hand, the beads could be redispersed in water after filtering and washing. Such dispersions were not stable, i.e., the alcohol particles soon rose to the surface.

Under some conditions, a slurry was formed instead of the beads when a solid alcohol was treated in the described manner. For example, the use of butyl Cellosolve, in the ratio of 30 milliliters of butyl Cellosolve to 60 milliliters of water, resulted in a slurry, which formed a gel upon dilution with water. However, a decrease in the ratio to 20 milliliters of butyl Cellosolve to 70 milliliters of water resulted in a slurry which, upon dilution (or placing) in water, immediately dispersed into particles ranging from 0.1 to 0.24 millimeter diameter. A ratio of 15 milliliters of butyl Cellosolve to 75 milliliters of water produced a slurry having similar properties. These slurries appeared to be fairly uniform and quite stable. These slurries make it possible to pump a finely dispersed evaporation-retarding alcohol on the water surface without the difficulties which are caused by the use of a previously dispersed stock "solution" wherein the particles soon rise to the top.

Stable suspensions of the alcohol particles were prepared by mixing the particles into a gel of 0.25 percent neutralized Carbopol 934. (Carbopol 934 is the trademark for a high molecular weight carboxy vinyl polymer manufactured by the B. F. Goodrich Chemical Co.) Suspensions containing 10 percent, 20 percent, and 50 percent of the solid alcohol particles were prepared. In retarding evaporation of water, these suspensions can be pumped on the water surface without the difficulty caused by the separation of the particles.

Increasing the solid alcohol to solvent ratio caused the particles to be larger, e.g., using a 2 to 1 water to ethanol ratio, 20 grams of the solid alcohol per 80 milliliter of water/alcohol solvent yielded particles in the .05 to 0.1 millimeter range, while 30 grams of the solid alcohol per 70 milliliter of water/ethanol solvent yielded particles about 1 millimeter in diameter.

When using the higher solvent to water ratios some of the solid alcohol remained in solution in the liquid. However, this need not be a great disadvantage because the liquid can be recovered as the filtrate and used repeatedly, possibly replacing the solvent lost by evaporation as necessary to maintain the original ratio.

Using both hexadecanol and a solid alcohol, which was predominantly $C_{18}$ with minor amounts of $C_{16}$ and $C_{20}$, resulted in similar results being obtained.

Any of the particles formed by the process of the foregoing examples, wherein the particles had a diameter of not more than 0.25 millimeter were found to be very effective in reducing the water evaporation. For example, the use of eicosanol "beads" prepared in accordance with my process resulted in a reduction in evaporation loss of about 67 percent, as compared to practically no reduction when using a large bar of the eicosanol.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

I accordingly claim:

1. A method of subdividing an alcohol having about 14 to about 30 carbon atoms and selected from the group consisting of alkanols, alkenols, alkyl substituted cycloalkanols, and alkoxyalkanols, characterized as being a solid at room temperature, into finely divided particles, said method comprising: adding from about 2 to about 25 parts of said alcohol to about 100 parts of a water-soluble solvent selected from the group consisting of alkanols of 1–4 carbon atoms, glycols, ethylene glycol monomethyl ether, ethylene glycol monoethyl ether, ethylene glycol monobutyl ether, glycerine, acetone, methylethyl ketone, and mixtures thereof with an effective amount of up to about 81.25 weight percent water, heating the resulting mixture to a temperature above the melting point of said alcohol, forming said alcohol in finely divided particles by cooling said mixture with agitation below the melting point of said alcohol, and then recovering the finely divided particles of said alcohol.

2. The method of claim 1 wherein the alcohol which is being subdivided contains from about 16 to about 20 carbon atoms.

3. The method of claim 1 wherein the solvent is a mixture of water and the monomethyl ether of ethylene glycol.

4. The method of claim 1 wherein the solvent is a mixture of water and the monoethyl ether of ethylene glycol.

5. The method of claim 1 wherein the solvent is a mixture of water and the monobutyl ether of ethylene glycol.

6. The method of claim 1 wherein the solvent is a mixture of water and ethanol.

7. The method of claim 1 wherein the solvent is a mixture of water and hexylene glycol.

References Cited in the file of this patent

UNITED STATES PATENTS

| | | |
|---|---|---|
| 2,308,192 | Mikeska et al. | Jan. 12, 1943 |
| 2,394,848 | Doumani | Feb. 12, 1946 |
| 2,878,098 | Treloar et al. | Mar. 17, 1959 |
| 2,903,330 | Dressler | Sept. 8, 1959 |
| 2,907,627 | Cummings | Oct. 6, 1959 |
| 2,925,318 | Crawford et al. | Feb. 16, 1960 |